(No Model.)
M. HENIUS.
TEMPERATURE INDICATING STIRRING APPARATUS.
No. 594,533. Patented Nov. 30, 1897.
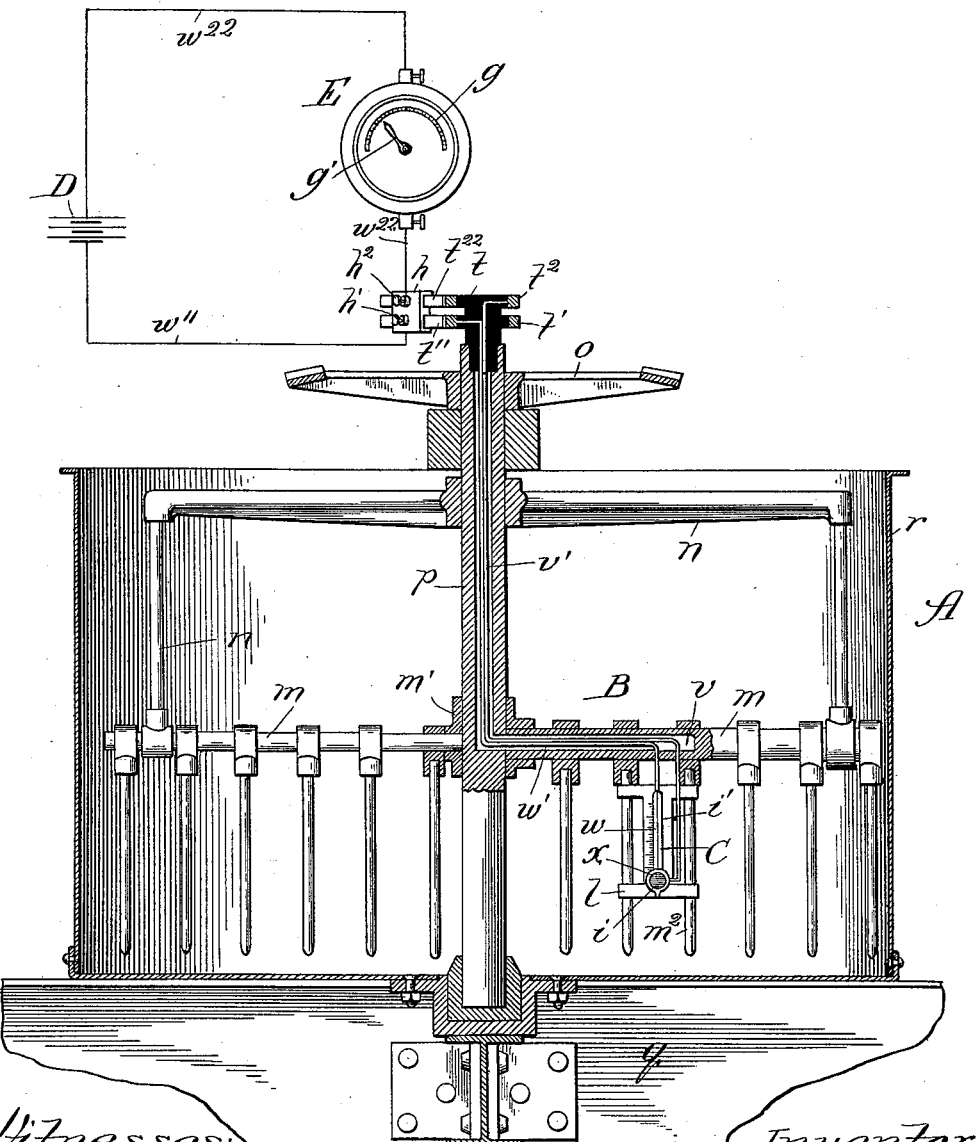
Witnesses:
Chas. E. Gaylord,
Lester J. Filter
Inventor:
Max Henius,
By Dyrenforth & Dyrenforth,
Att'ys

UNITED STATES PATENT OFFICE.

MAX HENIUS, OF CHICAGO, ILLINOIS.

TEMPERATURE-INDICATING STIRRING APPARATUS.

SPECIFICATION forming part of Letters Patent No. 594,533, dated November 30, 1897.

Application filed March 29, 1897. Serial No. 629,808. (No model.)

*To all whom it may concern:*

Be it known that I, MAX HENIUS, a citizen of the United States, residing at Chicago, in the county of Cook and State of Illinois, have invented a new and useful Improvement in Temperature-Indicating Stirring Apparatus, of which the following is a specification.

In a brewer's mash-tun and other apparatus—such, say, as is used in distilleries, sugar-refineries, and the like—wherein a liquid or semiliquid substance requires while being stirred to have the temperature of the contents more or less carefully watched the matter of taking the temperature is rendered inconvenient and unreliable, as it is commonly practiced either by supporting a thermometer stationarily in the receptacle containing the material or periodically dipping it into the latter. The first-named method is attended with the objection that it is inaccurate, because the thermometer becomes covered or clogged with the solid matter in the contents of the receptacle, which tends to insulate the instrument, and because the temperature indicated can only be that at one part of the receptacle, instead of being, as it should be, the average temperature of the mass. The other method, of dipping the instrument into the contents, is objectionable because of its inconvenience and also because of its inaccuracy, since the temperature-indication thereby obtained is not the average temperature of the whole mass. I overcome these objections by attaching a thermometer to the movable stirrer of the apparatus, whereby it is moved through the entire mass of the material, and is thus prevented from becoming coated or clogged with the solid matter.

For the purpose of explanation and by reason of the fact that I have more especially devised my improvement for use with a brewer's mash-tun the description hereinafter contained is confined to its application in that connection. Moreover, the feasible way of employing a thermometer for its indicating purpose on a moving stirrer is to cause it to show its indications electrically. Hence I provide an electrical thermometer and show a construction thereof suitable for my purpose in the accompanying drawing in connection with a brewer's mash-tun.

The drawing presents a broken view, in sectional elevation, of a mash-tun provided with my improvement.

A is a mash-tun of any suitable or known general construction. That shown comprises a receptacle $r$ on a base $q$, in which is stepped a rotary vertical shaft $p$, passing through the receptacle at its center and carrying at its upper end means through the medium of which to drive it, shown as a beveled gear-wheel $o$, and within the receptacle the stirrer B, shown as formed of bent arms $n$, extending from the shaft and carrying the rake-like heads $m$, proceeding laterally from a hub $m'$ on the shaft $p$.

C is a thermometer supported on the stirrer, preferably, as shown, on pendent fingers $m^2$ of one of the stirrer-heads $m$, as through the medium of the thermometer-frame $l$.

With the thermometer in the position described it is carried by the rotation of the stirrer through the mash in the receptacle $r$, thereby causing it to throw off any of the solid material that might tend to adhere to it and to be subjected to the varying temperatures of different parts of the mash, which the thermometer may itself be caused to register by employing a well-known or suitable form of registering-thermometer.

Whatever the character or form of thermometer employed, it should be, and preferably is, caused to indicate the temperature electrically, to which end I may employ the following-described construction of apparatus:

The thermometer C illustrated is of the ordinary mercurial variety, comprising a holder for the mercury involving a glass bulb $i$, in which the mercury is indicated at $x$, and a tubular extension $i'$ of the bulb. The thermometer may, however, be of any other suitable variety. In the tube $i'$ and dipping at one end into the thermostatic column $x$ is a fine wire $w$, preferably of platinum, which projects at its opposite end through the extremity of the tube, whence it is connected with a wire $w'$, which should be of lower resistance or heavier than the wire $w$. From the thermostatic column there extends through the bulb $i$ a wire $w^2$ like the wire $w'$. Both of the wires $w'$ and $w^2$, which should be insulated, are shown as extending through a chamber $v$ in the horizontal arm of one of the stirrer-heads $m$ and through the opening $v'$, communicating with said chamber and formed longitudinally in the shaft $p$ into engagement, respectively, with electrical contact-pieces $t'$ and $t^2$ in the shape of collars supported on a head $t$ of insulating material surmounting the outer end of the stirrer-shaft. With these contact-pieces $t'$ and $t^2$ there engage the brushes $t^{11}$ and $t^{22}$, projecting from a supporting-head $h$, carrying binding-screws $h'$ and $h^2$, which respectively connect a wire $w^{11}$, leading from one pole of a generator D, (battery,) with a wire $w'$ as a continuation of the latter, and a wire $w^{22}$, leading from the other pole of the generator, with the wire $w^2$ as a continuation thereof. Interposed in the wire $w^{22}$ is an electric meter E of any desired, known, or suitable construction, shown as provided with a scale $g$ and index-finger $g'$.

The operation is as follows: The resistance of the wire $w$ should be sufficient to prevent passage over it of the battery-current or any material portion thereof when the thermostatic column is at the lowest or any predetermined point in the thermometer. As the column reaches, under the influence of temperature of the mash in the receptacle $r$, higher points or points above the predetermined point referred to in the tube $i'$, being a conductor of electricity, it practically thickens the wire $w$ to the height to which the column reaches, and accordingly reduces the length of the high-resistance section of the wire, permitting more and more of the battery-current to pass over it through the meter E, on which the variations in resistance are indicated on the scale $g$, which may denote the temperature by electrical units or in conventional degrees denoting temperature properly arranged with relation to said electrical units.

What I claim as new, and desire to secure by Letters Patent, is—

In combination, a stirring apparatus A comprising a receptacle $r$ containing an upright rotary shaft $p$ carrying a stirrer B and provided on its outer end with insulated contacts $t'$ and $t^2$, a thermometer C on said stirrer and comprising a holder containing a thermostatic column, a high-resistance conducting-wire $w$ confined in the holder to contact toward one end with said column, a wire $w'$ leading from said high-resistance wire to one of said contacts, a wire $w^2$ leading from said column to the other of said contacts, brushes engaging said contacts, a generator D having its poles connected, respectively, by wires $w^{11}$ and $w^{22}$ with said brushes, and an electric indicator included in the generator-circuit, the whole being constructed and arranged to operate substantially as described.

MAX HENIUS.

In presence of—
R. T. SPENCER,
J. H. LEE.